Aug. 14, 1945.  M. S. JOHNSON  2,382,794
BRAKE HEAD AND BRAKE BEAM ADAPTER
Filed May 19, 1944  2 Sheets-Sheet 1
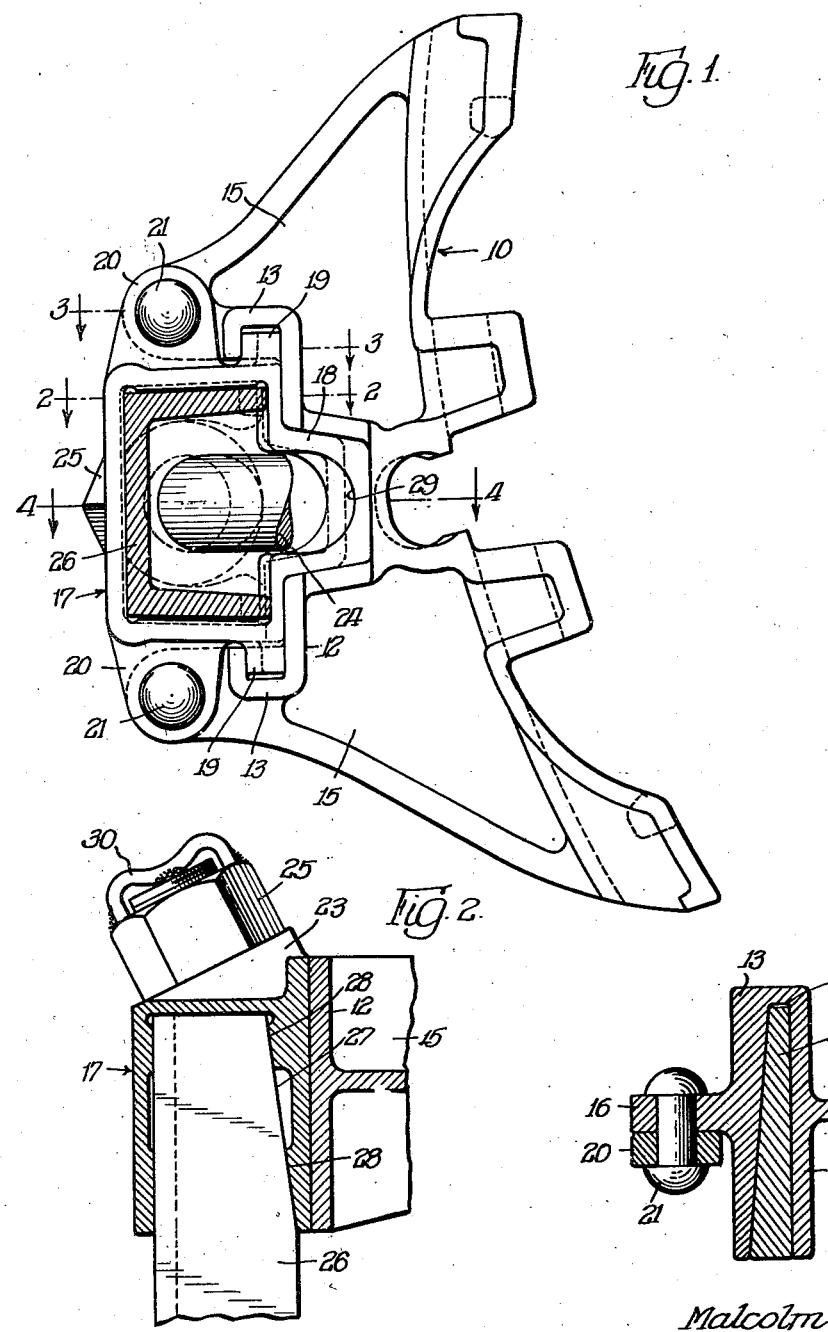
INVENTOR.
Malcolm S. Johnson
BY
Atty.

Aug. 14, 1945.　　　M. S. JOHNSON　　　2,382,794
BRAKE HEAD AND BRAKE BEAM ADAPTER
Filed May 19, 1944　　　2 Sheets-Sheet 2
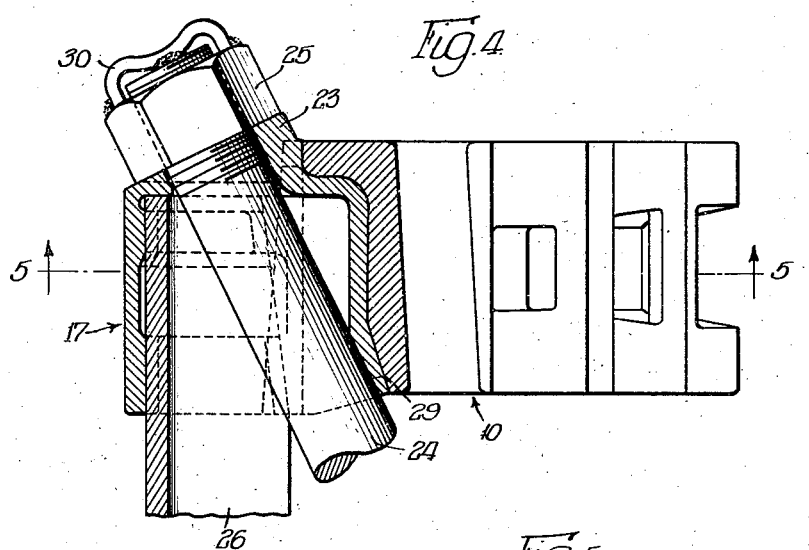
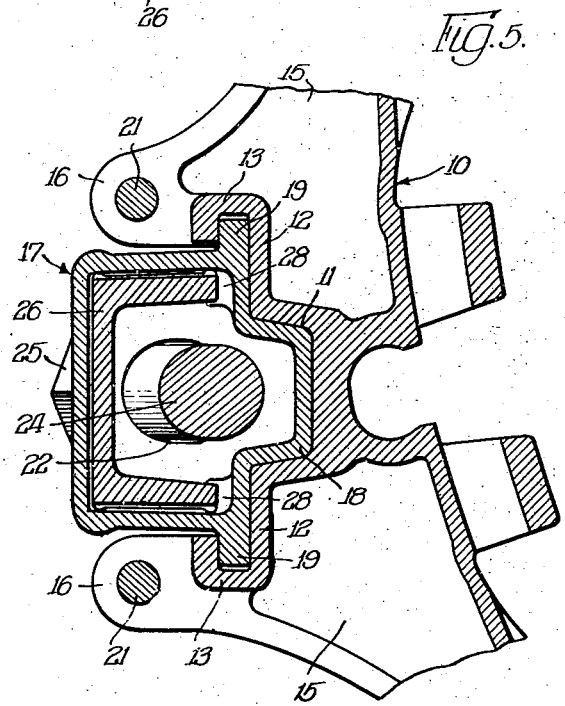
INVENTOR.
Malcolm S Johnson,
BY Patented Aug. 14, 1945

2,382,794

UNITED STATES PATENT OFFICE 2,382,794

BRAKEHEAD AND BRAKE BEAM ADAPTER

Malcolm S. Johnson, Chicago, Ill., assignor to Illinois Railway Equipment Company, Chicago, Ill., a corporation of Illinois Application May 19, 1944, Serial No. 536,392

4 Claims. (Cl. 188—226)

My invention relates to a railroad car brake head and to means whereby the compression member and the tension rod are anchored together at their ends and the brake head secured and held in place; the invention contemplating an anchor member which may be removably secured to the ends of the brake beam with the tension rod and which also effects interlocking engagement with the brake head so as to permit the latter to be readily removed without interfering with the anchored relation between the members of the brake beam.

In the present day or A. A. R. design of brake beam, the brake head constitutes the means whereby the ends of the compression member and tension rod are tied together, so that when the brake head becomes worn or broken it becomes necessary to remove the member and the tension rod; broken or worn heads being the main reason for brake beam removal to permit renewal of the brake head. The beam with attached head is then shipped to the nearest reclamation shop where it is dismantled, an operation requiring considerable handling, time and labor and which also results in damage to certain of the parts of the structure and consequently also requiring replacement of such parts in addition to the replacement of the broken brake head. According to the present practice in the reclamation shop, useable parts of the dismantled brake beam truss are salvaged for use in subsequently reclaimed beams. One of the frequent points of brake beam failures is at the roots of the threads on the tension rod, because with the present A. A. R. design the tightness of the brake head on the beam depends entirely on the friction of the tension rod nut against the brake head, with the result that when the tension rod flexes or stretches, the brake head becomes loose on the beam and eventually causes failure at the root of the threads on the rod. In the present design, the threads on the tension rod are checked to prevent loss of the nuts, so that very few tension rods can be reclaimed due to the injured threads. With the present design it is necessary to remove the nuts every time a new brake head is required; hence new tension rods must be applied at the reclamation shops, thereby greatly increasing the expense for brake head replacement.

With my improved structure, the compression member and tension rod anchoring means become a permanent part of the brake beam truss and provides the means whereby the brake head in removably secured in place, thus obviating the necessity of disturbing the truss in the beam and hence greatly reducing the expense heretofore incurred in replacing a worn or broken brake head.

The objects and advantages of my invention will be readily comprehended from the following detailed description of the accompanying drawings, wherein—

Figure 1 is a side elevation of my improved brake head and adapter with the compression member shown in section and a portion of the truss rod broken away.

Figure 2 is a detail sectional view taken on the line 2—2 of Figure 1 looking in the direction of the arrows.

Figure 3 is a detail sectional view on the line 3—3 of Figure 1 as viewed by the arrows.

Figure 4 is a sectional plan taken substantially on the line 4—4 of Figure 1.

Figure 5 is a cross section taken on the line 5—5 of Figure 4 looking in the direction of the arrows, with the ends of the brake head broken away.

In structures as at present employed, the compression members generally are of channel formation in cross section and the brake heads on their rear sides are each provided with a socket of angular cross section adapted to receive the ends of the compression and the tension members, with the end of the latter threaded to receive a nut which engages the socketed wall of the brake head and holds the latter in place.

In my improved structure, the forward shoe receiving side of the brake head 10 is of standard formation, while the rear side of the brake head 10 is provided with a transversely disposed socket 11 open on the rear face and at one side of the head, and with vertically disposed straight wall portions 12, 12 above and beneath the socket and united at the inner end of the socket; and these wall portions 12, 12 terminate in the rearwardly disposed angular flange portions 13, 13 which provide slots extending transversely of the head and made tapering, as shown at 14 in Figure 3, toward the closed ends of the slots at the opposite or outer side of the head.

These flanged particles 13 are formed integral with the web portions 15 which terminate in the rearwardly disposed rivet or bolt receiving lobes 16, 16.

The brake head 10 is secured to the brake beam truss through the medium of an auxiliary head or box-like adapter 17, open at the inner or brake beam truss side of the head. The forward wall of the box-like adapter has an off-set intermediate portion 18 which matches and seats in the transverse socket 11 in the rear side of the brake head as shown in Figure 5, while the rear wall at opposite sides of the off-set portion 18 seats on the straight wall portions 12, 12 of the brake head and extends beyond the top and bottom walls of the adapter to provide flanges 19, 19 which enter the slots of the angular flange portions 13, 13 of the head. The flanges 19 extend transversely of the adapter and taper toward the outer closed end of the adapter to match and to effect wedging engagement with the tapered slots 14 of the flange portions 13, 13, as shown in Figure 3. The top and bottom walls of the box-like adapter 17, rearward of the flanges 19, 19, are provided with the vertically disposed apertured ears 20, 20, adapted to extend substantially parallel with the ears or lobes 16, 16 on the brake head; and the head is secured to the adapter by suitable rivets as at 21 in Figures 1 and 3.

The outer end wall of the adapter 17 is provided with a truss rod receiving opening at 22, see Figure 5; and the end wall about the opening is preferably provided with an annular boss 23, see Figure 4, which slopes or tapers toward the rear wall of the adapter, in keeping with the disposition or direction of pulling force exerted by the tension rod 24 of the brake beam truss, to provide a flat seating surface for the nut 25 which screws onto the threaded end of the tension rod which protrudes through the opening 22 in the adapter.

The pocket provided by the adapter 17 receives the end of compression member 26, which is of channel form; and the sides or flanges of the channel are tapered toward the end of the beam, as shown at 27 in Figure 2, to bear against the sloping boss portions 28, formed on the forward wall of the adapter, causing the base of the channel beam 26 to be forced against the rear wall of the adapter as shown in Figure 2, thus eliminating any clearance between the beam and the walls of the adapter.

The opening in the off-set portion 18 of the adapted preferably is flared at 29 and made arcuate to receive the round tension rod 24.

In assembling, the adapter 17 is driven onto the end of the member 26, with the tension rod 24 passing through the channel of the member 26 and the threaded end extending through the opening 22 in the side wall of the adapter, thereby securely anchoring the member and rod together. The nut 25 is then screwed up tightly on the protruding threaded end of the tension rod until it firmly seats on the sloping boss 23 on the end wall of the adapter.

In order to prevent the nut backing off or accidentally being removed, I show the end of the tension rod 24 provided with a suitable nut lock 30 whose intermediate portion is preferably tack welded to the end of the rod while the ends of the lock element may be tack welded to the nut 25.

As the adapter is not subject to wear it may become a permanent part of the brake beam and the anchored relation between the compression and tension members need not be disturbed when the brake head is to be replaced, as this can be accomplished by simply removing the rivets 21, without the necessity of dismantling the brake beam truss.

In the present day A. A. R. design, the tightness of the brake head on the beam depends on the friction of the tension rod nut and in the event the rod should stretch, the head becomes loose and its constant vibration eventually causes failure at the root of the threads. With my design, the anchor member or adapter is driven tightly onto the beam and firmly wedged or held thereon by the wedging surfaces 28, formed on the forward wall of the adapter pocket, and the tapered flanges of the compression member or element 26, thereby eliminating all clearance at the edges of the channel flanges and hence not depending entirely on the friction of the tension rod nut. Furthermore, by having portions of the brake head overlapping and engaging the top and the bottom of the adapter relative vertical movement between the head and adapter is prevented.

I have shown and described what I believe to be the best embodiment of my invention, but structural modifications may be possible without, however, departing from the spirit of my invention as defined in the appended claims.

What I claim is:

1. A brake head and adapter of the character described comprising a hollow member open at one side to receive the end of a compression element and having an opening in the opposite side surrounded by an annular sloping boss to receive the end of a tension rod, the forward side wall of the member intermediate its ends being outwardly off-set and flared on its inner side to seat about the tension rod while the upper and lower ends of said wall terminate in vertically disposed flanges tapering toward one of their ends; the top and bottom sides of the member having vertically disposed apertured ears; a brake head provided on its rear side with a transversely disposed socket adapted to receive the outwardly off-set forward wall portion of said member and having transversely disposed grooves tapering toward one of their ends adapted to receive the tapered flanges of said member, said rear side of the brake head having a pair of apertured lobes adapted to align with the apertured ears of said member; and means disposed through the apertures of said ears and lobes whereby the brake head is secured to said member against movement.

2. A brake head and brake beam adapter comprising a hollow member open on one side to endwisely receive the compression element and tension rod of the brake beam, the opposite side of the member having an opening for passage of the tension rod therethrough, the top and bottom walls of said member having transversely extending flanges tapering toward one of their ends; and a brake head whose rear side is formed to seat against said member and is provided with rearwardly disposed portions having grooves tapering toward one of their ends and adapted to receive and effect wedging relation with the tapered flanges of the adapter, whereby the head is removably secured to the adapter; and means whereby the head is secured to the adapter against movement lengthwisely of the beam.

3. A brake head and brake beam adapter comprising a hollow box-like member open on one side to endwisely receive a brake beam and tension rod, the opposite side of the member having an opening for passage of the end of the tension rod, the forward wall of the member intermediate its top and bottom being forwardly offset to permit introduction of the forwardly sloping tension rod, the wall above and below said offset portion being vertically disposed with substantially flat bearing surfaces, while the top and bottom walls of the member are provided with transversely disposed tapered ribs; a brake head whose rear side is provided with a socket adapted to receive said forwardly offset portion of said member to have supporting relation therewith and with vertical flat walls above and beneath said socket to seat against the vertical flat bearing surfaces of said member, said vertical walls of the brake head terminating in transversely extending tapered grooves closed at the outer side of the brake head and adapted to endwisely receive the ribs on said member whereby a self-locking and non-tilting relation between the head and the adapter is effected; and means whereby the brake head is held against movement lengthwisely of the adapter.

4. A brake head and brake beam adapter comprising a hollow member open at one side to endwisely receive the tapered end of the compression member, the forward wall of the member having a sloping surface increasing laterally toward the opposite end of said member and adapted to wedgingly engage the tapered end of the compression member, the opposite end of the member having an opening for passage of the end of a tension rod therethrough, the forward wall of said member having wide brake head engaging surfaces and a forwardly offset hollow portion for passage of the tension rod and to provide support for the brake head, the top and bottom sides of the member having vertically disposed flanges tapering toward one of their ends; and a brake head provided on its rear side with a transverse socket open at one side of the head adapted to receive said forwardly offset portion of the member and having a pair of transverse grooves open at one side of the head and tapering toward the opposite closed ends, said grooves being adapted to receive the tapered flanges of said member whereby a non-tilting and interlocking relation between the brake head and member is provided.

MALCOLM S. JOHNSON.